(12) United States Patent
Doyle, III

(10) Patent No.: US 12,454,233 B2
(45) Date of Patent: Oct. 28, 2025

(54) TRAILER TANDEM POSITION SENSOR

(71) Applicant: R.A. Phillips Industries, Inc., Irvine, CA (US)

(72) Inventor: Marquis D. Doyle, III, Boone, NC (US)

(73) Assignee: R.A. Phillips Industries, Inc., Irvine, CA (US)

( * ) Notice: Subject to any disclaimer, the term of this patent is extended or adjusted under 35 U.S.C. 154(b) by 0 days.

(21) Appl. No.: 18/757,039

(22) Filed: Jun. 27, 2024

(65) Prior Publication Data

US 2025/0001958 A1  Jan. 2, 2025

Related U.S. Application Data

(60) Provisional application No. 63/511,110, filed on Jun. 29, 2023.

(51) Int. Cl.
*B60R 16/023* (2006.01)
*G06K 19/07* (2006.01)

(52) U.S. Cl.
CPC ...... *B60R 16/0232* (2013.01); *G06K 19/0725* (2013.01)

(58) Field of Classification Search
CPC .......... B60R 16/0232; G06K 19/0725
See application file for complete search history.

(56) References Cited

U.S. PATENT DOCUMENTS

| | | | |
|---|---|---|---|
| 8,957,770 B2* | 2/2015 | Hu | H04L 67/12 340/425.5 |
| 2018/0039266 A1* | 2/2018 | Dotzler | B60D 1/26 |
| 2018/0147900 A1* | 5/2018 | Shank | G06T 7/60 |
| 2023/0150321 A1* | 5/2023 | List | B25J 5/007 701/25 |

* cited by examiner

*Primary Examiner* — Nay Tun
(74) *Attorney, Agent, or Firm* — Womble Bond Dickinson (US) LLP

(57) ABSTRACT

A tandem position sensing system of a vehicle includes a plurality of radio frequency identification (RFID) tags coupled to a trailer or a chassis of the vehicle and arranged along a first direction; and an RFID reader coupled to a sliding tandem of the vehicle that is moveable relative to the trailer or the chassis, the RFID reader being configured to identify a unique identifier of one the plurality of RFID tags that is proximate to the RFID reader, the unique identifier corresponding to a position of the sliding tandem relative to the trailer or the chassis.

17 Claims, 3 Drawing Sheets

TRAILER TANDEM POSITION SENSOR

CROSS-REFERENCE TO RELATED APPLICATION(S)

This application claims priority to, and the benefit of, U.S. Provisional Application No. 65/511,110 ("TRAILER TANDEM POSITION SENSING SYSTEM"), filed on Jun. 29, 2023, the entire content of which is incorporated herein by reference.

FIELD

The present disclosure relates to truck-trailer systems and methods of using the same.

BACKGROUND

Most semi-tractor trailers in the US have sliding tandems, which are a set of 8 wheels on two axles that are moveably coupled to the rear underside of the trailer. The tandems can slide along a track under the trailer to allow for the distribution of weight of the trailer to be adjusted to support legal weight distribution, better ride control, handling, and turning radius. Some states (e.g., Michigan and California) have laws pertaining to the minimum and maximum lengths that the tandem can be adjusted to in order to alleviate concerns with semi ride control and/or road weight distribution. It is currently the responsibility of the driver to confirm that the tandem is positioned to a length that is allowed under the laws pertaining to the state in which the semi will be transiting. Violating these laws can result in Federal Motor Carrier Safety Administration (FMCSA) violations, fines, and/or other driver infractions.

Furthermore, the position of the tandem is a significant factor in the turning radius of the overall vehicle when connected to the semi-trailer. For example, a tandem set all the way to the rear of the trailer may have a significantly greater turning radius than a tandem that is set closer to the front of the trailer. As such, when entering inner cities, some drivers may adjust the tandem to provide better turning radius to avoid hitting curbs on turns in tight areas. In the related art, tandem position observations are performed manually/visually by the driver, and the process of repositioning the sliding tandem may require the driver to exit and reenter the truck cab many times to visually check the actual position of the tandem and to move the tractor, which can be tedious and time consuming.

The above information disclosed in this Background section is only for enhancement of understanding of the background of the invention and therefore it may contain information that does not form the prior art that is already known to a person of ordinary skill in the art.

SUMMARY

Aspects of embodiments of the present invention are directed to a tandem position sensing system including a plurality of RFID tags with unique identifications that are mounted to the underside of a trailer/chassis, and an RFID reader attached to a fixed position on the sliding tandem, which can read the unique identifiers of the RFID tags, and can translate the unique RFID identifications and their relative signal strength into a sliding tandem position (e.g., in real time). In some examples, the positions of the RFID tags and reader may be reversed, that is, the RFID tags may be coupled to the moveable tandem and the RFID reader may be connected to a fixed position at the underside of the trailer. The tandem position sensing system may further include a communication circuit capable of delivering the information gathered and analyzed to another processor that can deliver the data to the driver or autonomous truck controller to make actionable decisions from.

According to some embodiments of the present disclosure, there is provided a tandem position sensing system of a vehicle, including: a plurality of radio frequency identification (RFID) tags coupled to a trailer or a chassis of the vehicle and arranged along a first direction; and an RFID reader coupled to a sliding tandem of the vehicle that is moveable relative to the trailer or the chassis, the RFID reader being configured to identify a unique identifier of one the plurality of RFID tags that is proximate to the RFID reader, the unique identifier corresponding to a position of the sliding tandem relative to the trailer or the chassis.

In some embodiments, the sliding tandem is configured to move relative to the trailer or the chassis along the first direction, and wherein the first direction is a longitudinal direction of the trailer or the chassis.

In some embodiments, the plurality of RFID tags are fixedly coupled to a tag platform that is fixedly coupled to an underside of the trailer or the chassis, and at least an antenna of the RFID reader is fixedly coupled to a cross-bar of the sliding tandem below the tag platform.

In some embodiments, the tag platform includes at least one of a rail, a channel, or a strip, and extends along the first direction, and the plurality of RFID tags are adhered to the tag platform.

In some embodiments, the antenna of the RFID reader and the tag platform are oriented such that the RFID tags pass directly above the antenna of the RFID reader as the sliding tandem moves relative to the trailer or the chassis, and a vertical offset between the RFID reader and the tag platform is about 1 inch to about 3 inches.

In some embodiments, the plurality of RFID tags are arranged at regular intervals.

In some embodiments, the sliding tandem has a plurality of tandem locking positions, and is configured to lock in position relative to the trailer at each of the plurality of tandem locking positions, the plurality of tandem locking positions are spaced at regular intervals, and at least one of the plurality of RFID tags corresponds in position to each of the plurality of tandem locking positions.

In some embodiments, a separation between adjacent ones of the tandem locking positions is integer multiples of a separation between adjacent ones of the plurality of RFID tags.

In some embodiments, a spacing between consecutive ones of the plurality of tandem locking positions is about 4 inches to about 6 inches, and a spacing between consecutive ones of the plurality of RFID tags is about 2 inches to about 4 inches.

In some embodiments, an RFID tag of the plurality of tags includes: a tag antenna configured to transmit and receive radio frequency (RF) signals; and an integrated circuit configured to store a unique identifier of the RFID tag, to receive RF energy from the tag antenna, and to modulate the RF energy with the unique identifier to generate a modulated RF signal for transmission by the tag antenna.

In some embodiments, the RFID reader includes: a reader antenna configured to transmit and receive RF signals; and a processing circuit configured to generate an RF signal for transmission by the reader antenna, to receive a modulated RF signal from the one the plurality of RFID tags that is proximate to the RFID reader via the reader antenna, and to detect the unique identifier based on the modulated RF signal.

In some embodiments, the processing circuit is further configured to determine the position of the sliding tandem relative to the trailer or the chassis based on the unique identifier, and the unique identifier includes data indicating a corresponding tandem locking position.

In some embodiments, the processing circuit is further configured to determine the position of the sliding tandem relative to the trailer or the chassis based on the unique identifier and a lookup table.

In some embodiments, the lookup table is stored at the processing circuit and maps unique identifiers of the plurality of RFID tags to a plurality of relative positions of the sliding tandem and the trailer or the chassis.

In some embodiments, the RFID reader further includes: a communication circuit in electrical communication with a telematics gateway circuit at the trailer or the chassis of the vehicle and is configured to transmit data generated by the processing circuit to the telematics gateway circuit over a controller area network (CAN) bus of the trailer or the chassis, an RS232/485 connection, a power line communication (PLC) connection, or a wireless communication link.

In some embodiments, the RFID reader further includes: an internal battery configured to provide electrical power to the RFID reader.

In some embodiments, the RFID reader is coupled to an electrical system of the trailer or the chassis of the vehicle and receives electrical power from at least one of an electrical circuit of an anti-lock braking system (ABS) of the trailer or the chassis, a light circuit providing power to lights of the trailer or the chassis, a power-over-ethernet (PoE) connection, or a solar panel of the trailer or the chassis.

Other aspects, features, and characteristics that are not described above will be more clearly understood from the accompanying drawings, claims, and detailed description.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be illustrative only.

DETAILED DESCRIPTION

The detailed description set forth below in connection with the appended drawings is intended as a description of illustrative embodiments of a trailer system including a tandem position sensor in accordance with the present invention, and is not intended to represent the only forms in which the present invention may be implemented or utilized. The description sets forth the features of the present invention in connection with the illustrated embodiments. It is to be understood, however, that the same or equivalent functions and structures may be accomplished by different embodiments that are also intended to be encompassed within the spirit and scope of the present invention. As denoted elsewhere herein, like element numbers are intended to indicate like elements or features.

Aspects of embodiments of the present disclosure are directed to a tandem position sensing system mounted to a trailer (e.g., the undercarriage of the trailer) and chassis, which is capable of measuring the position of the trailer/chassis sliding tandem and reporting this information to the driver of the vehicle and/or to a dispatch/external server.

Figure 1:
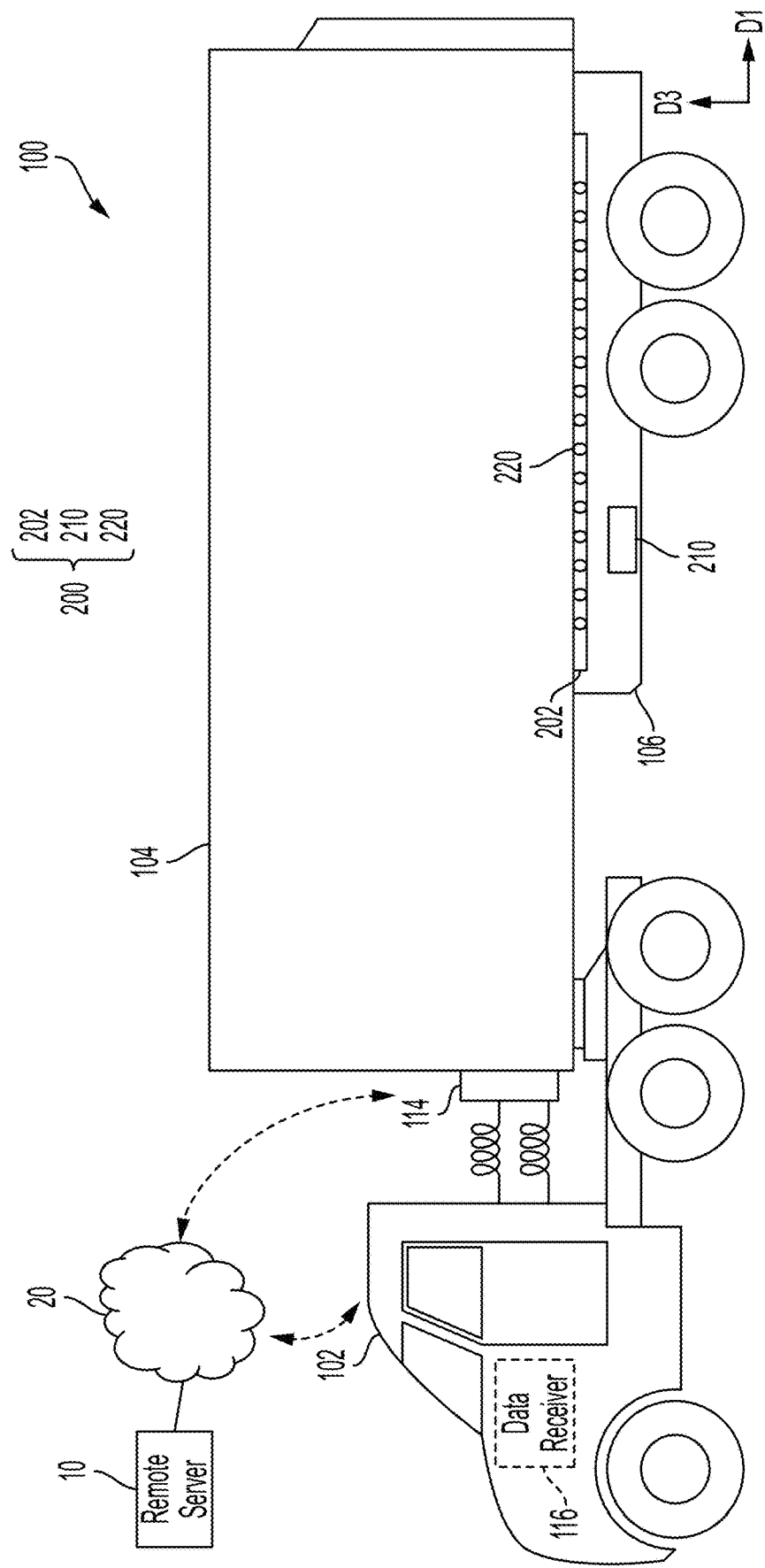
FIG. 1 illustrates a vehicle utilizing the tandem position sensing system, according to some embodiments of the present disclosure.
Figure 2:
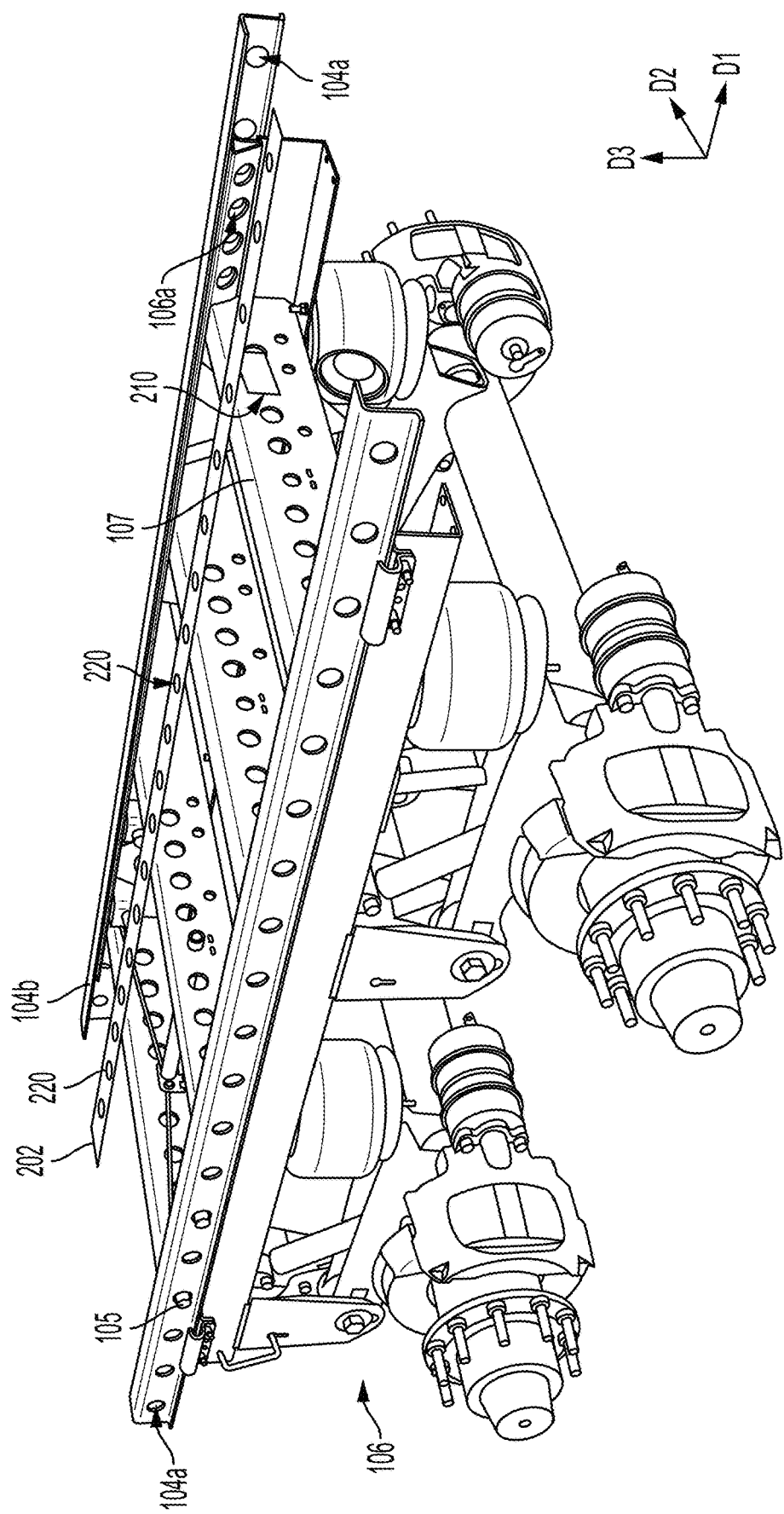
FIG. 2 is a perspective view of the portion of the vehicle illustrating the sliding tandem and the tandem position sensing system, according to some embodiments of the present disclosure.
Figure 3:
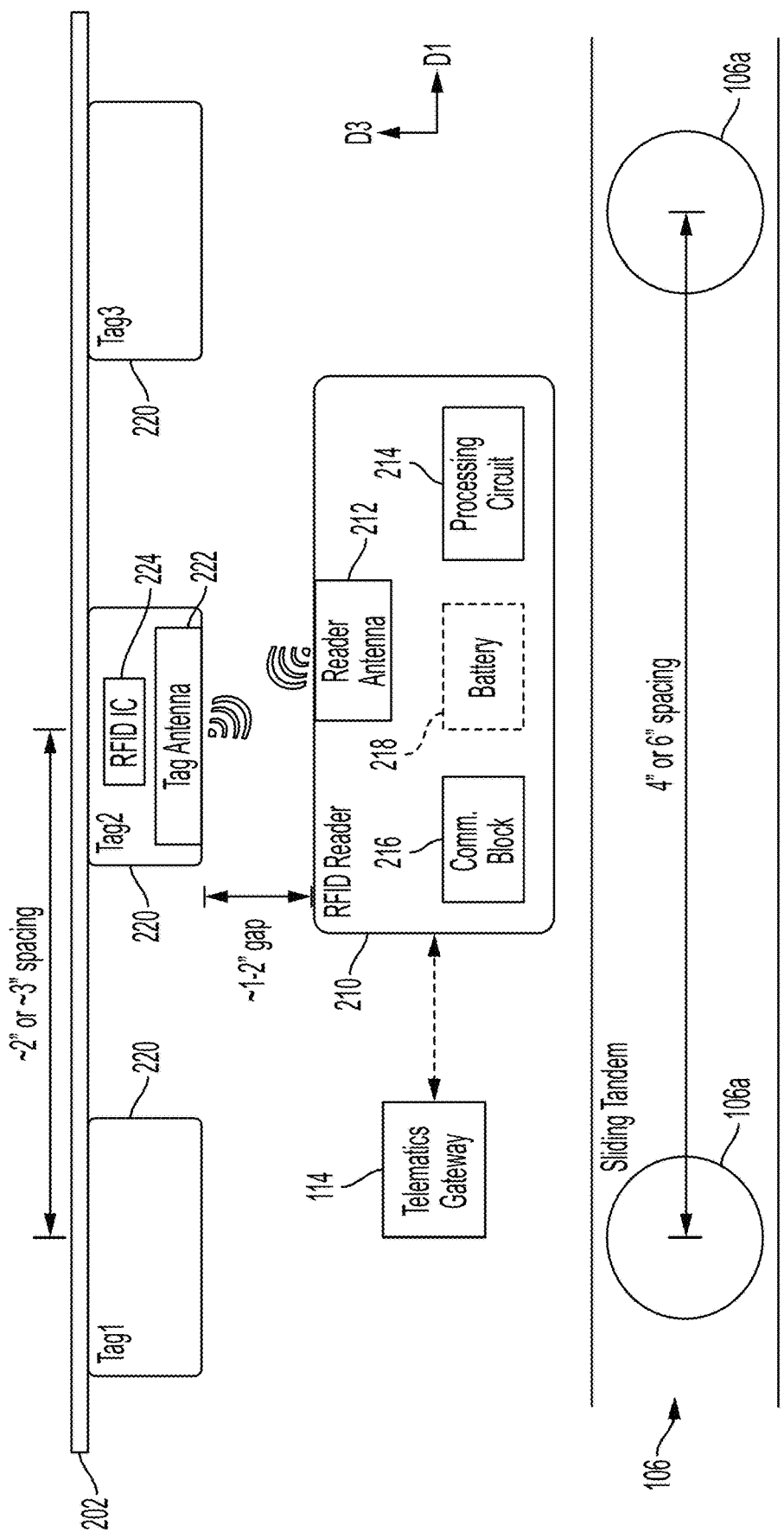
FIG. 3 illustrates a block diagram of the tandem position sensing system, according to some embodiments of the present disclosure.

FIG. 1 illustrates a vehicle utilizing the tandem position sensing system, according to some embodiments of the present disclosure. FIG. 2 is a perspective view of the a portion of the vehicle illustrating the sliding tandem and the tandem position sensing system, according to some embodiments of the present disclosure. FIG. 3 illustrates a block diagram of the tandem position sensing system, according to some embodiments of the present disclosure.

Referring to FIGS. 1 and 2, the vehicle (e.g., the heavy duty vehicle) 100 includes a tow vehicle (e.g., a truck or tractor) 102 coupled to a trailer/chassis 104, which has a sliding tandem 106 with a set of wheels that can slide along the length of the trailer/chassis 104. In some embodiments, the tandem position sensing system 200 includes a radio frequency identification (RFID) reader 210 fixedly mounted to the sliding tandem 106 that can move forward and backward with respect to the trailer/chassis 104 along a first direction D1 (e.g., the longitudinal direction of the trailer or the chassis), and further includes a plurality of RFID tags 220 fixedly connected to the underside (e.g., an undercarriage) of the trailer/chassis 104 at fixed positions (e.g., at predefined intervals). Each of the RFID tags 220 has a unique identifier that the RFID reader 110 may map to a particular location under the towed vehicle. The RFID reader 210 is configured to identify the unique identifier of one the plurality of RFID tags that is proximate to (e.g., closest to) the RFID reader 210 and to map the identifier to a particular position of the sliding tandem relative to the trailer/chassis 104.

As illustrated in FIG. 2, in some examples, the RFID tags 220 may be prepositioned on/within a tag platform 202 that is installed (e.g., fixedly coupled) at the bottom/underside of the trailer/chassis 104. The RFID reader 210 may be positioned at the sliding tandem 106 in such a way that it is able to read the RFID tags 220 on the tag platform 202. For example, at least an antenna of the RFID reader 210 may be attached to a cross-bar 107 of the sliding tandem 106, which may extend in a second direction D1 (that crosses the first direction D1), below the tag platform 202, such that when the slider tandem 106 moves back and forth relative to the trailer/chassis 104, the RFID tags 220 pass directly above the antenna of the RFID reader 210. The remainder of the RFID reader electronics may be mounted in the same enclosure as, or in a separate enclosure from, the antenna element of the RFID reader 210.

The tag platform 202 may be a long rail, channel (e.g., U-channel), strip, or the like, and may be made of any suitable non-conductive material such as plastic, fiberglass, and/or the like. The tag platform 202 may also be made of conductive material, such as metal, so long as a layer of non-conductive material is positioned between the conductive platform 202 and the RFID tags 220. The tag platform 202 may be mounted to one or more frame cross members (e.g., cross bars or I-beams) at the undercarriage of the trailer/chassis 104 in any suitable manner. For example, the tag platform 202 may be attached to the trailer/chassis 104 by any suitable means, such as welding, fastening (e.g., via rivets/screws), adhering via an adhesive, and/or the like.

The position of the RFID reader 110 and the RFID tags 220 are not limited to that described above. For example, the strip of RFID tags 220 may be installed at the tandem 106 and may move forward and backwards with the tandem 106, and the RFID reader 210 may be attached to a fixed position under the towed vehicle 104 in close proximity to the strip.

The position of the sliding tandem 106 relative to the trailer/chassis 104 may be locked by virtue of one or more pins 105 that pass through corresponding ones of the trailer/chassis holes 104a and tandem holes 106a when correctly lined up. Thus, tandem locking positions may be defined as positions where the holes 104a and 106a line up (to allow passage of the one or more pins 105). In some embodiments, at least one of the RFID tags 220 corresponds in position to each of the tandem locking positions. For example, when the tandem locking positions are spaced at regular intervals, at least some of the RFID tags 220 may be spaced at the same regular interval. In some embodiments, a separation between adjacent ones of the tandem locking positions is integer multiples (e.g., 1×, 2×, ...) of a separation between adjacent ones of the plurality of RFID tags 220. For example, when the tandem locking positions are spaced at 4-inch intervals, the adjacent RFID tags 220 may be spaced apart by about 4 inches, 2 inches, or about 1 inch.

Referring to FIG. 3, according to some embodiments, each RFID tag 220 includes a tag antenna 222 and an integrated circuit (IC; or RFID IC) 224. The tag antenna 222 is configured to transmit and receive radio frequency (RF) signals. In some examples, the tag antenna 222 may activate the RFID IC 224 in response to receiving an RF signal. The RFID IC 224 stores the unique identifier of the RFID tag 220 (e.g., in an internal memory). When the RFID IC 224 receives RF energy from the tag antenna 222, it modulates the RF energy with the unique identifier to generate a modulated RF signal for return transmission by the tag antenna 222.

In some embodiments, the RFID reader 210 includes a reader antenna 212, a processing circuit 214, and a communication circuit 216. The reader antenna 212 is configured to transmit and receive RF signals. The processing circuit 214 is configured to generate an RF signal for transmission by the reader antenna 212, to receive a modulated RF signal from an RFID tag 220 that is proximate to (e.g., closest to) the RFID reader 210 via the reader antenna 212, and to detect the unique identifier based on the modulated RF signal. The reader antenna 212 may transmit/receive at around 13.56 MHz, however, this is merely an example, and any suitable interrogation frequency may be employed. Further, width of the beam produced by the reader antenna 212 may depend on the separation between adjacent RFID tags 220 (e.g., narrower beam for shorter separation). Further, the transmit strength and receive sensitivity of the reader antenna 212 may depend on the vertical offset (e.g., along the third direction D3) between the reader antenna 121 and the RFID tags 220, and other factors.

In some embodiments, the processing circuit 214 translates the unique RFID identifications from one or more nearby RFID tags 220 and their relative signal strengths into a sliding tandem position. As the slider tandem 106 moves relative to the trailer/chassis 104, the RFID tags 220 will move relative to the RFID reader 210. As an RFID tag 220 moves closer to the reader antenna 212, its corresponding signal strength will grow until it reaches a maximum when the RFID tag 220 is directly above the reader antenna 212 (and the two RFID tags 220 are aligned in the vertical direction D3). This signal strength diminishes as the RFID tag 220 moves further away from the reader antenna 212. By monitoring this signal strength, the RFID reader 210 can determine when it is aligned with a particular RFID tag 220. However, embodiments of the present disclosure are not limited thereto. For example, the RFID reader 210 may merely identify an RFID tag 220 with the strongest signal strength and assume alignment with that RFID tag 220.

In some embodiments, the RFID reader 210 (e.g., the processing circuit 214) may then map the RFID tag identifier to a particular sliding tandem position. This mapping may be performed based on a lookup table stored in the memory of the processing circuit 214 that maps the individual unique identifiers of the tags to particular sliding tandem positions. However, embodiments of the present disclosure are not limited thereto. For example, the actual positions of the tandem holes 106a (which may be expressed as sequential numeric values) may be programmed into the non-volatile memories of the respective RFID tags 220, and may be read directly by the RFID reader 220 without the need for a lookup table.

When the reader antenna 212 is similarly distanced from two RFID tags 220 (e.g., is around the midpoint between adjacent tags 220), the strengths of the return signals from the adjacent tags 220 may be similar. This can create a collision zone in which the reader 210 may not be able to accurately determine the location of the sliding tandem 106. In such instances, the RFID reader 210 does not update/change its previous determination as to the sliding tandem position until the signal strength from one of the two adjacent tags 220 is maximized or greatly increased to the signal strength of the other.

The communication circuit 216 is configured to communicate the data generated by the processing circuit 214 to one or more external sources for compiling and/or further processing. This data may include, for example, the determined sliding tandem position and the unique identifier(s) of nearest RFID tag(s) 220.

In some examples, the communication circuit 216 may communicate directly with a telematics gateway (e.g., a telematics gateway circuit) 114, which may be at the nose box of the trailer/chassis 104 and have wireless communication capability, so the data from the processing circuit 214 may be transmitted via cellular or broadband (e.g., Wi-Fi) connection to an external server 10 (e.g., a remote server 10 on the cloud 20) for monitoring and/or processing. The communication circuit 216 may transmit data to the telematics gateway 114 over a controller area network (CAN) bus of the trailer/chassis 104, an RS232/485 connection, a power line communication (PLC) connection, a wireless communication link (e.g., Wi-Fi or Bluetooth) or any other connection via a suitable protocol.

In some examples, the external server 10 may transmit corresponding information to a data receiver 116 (e.g., a mobile tablet or phone, a display device, an autonomous truck controller, etc.) at the vehicle 100 (e.g., in the cab of tractor 102) to allow a truck driver or autonomous system to make actionable decisions based on the position of the sliding tandem 106. However, embodiments of the present disclosure are not limited thereto, and the communication circuit 216 may also communicate directly with the data receiver 116 via a wireless communication link (e.g., Wi-Fi or Bluetooth) or any other connection via a suitable protocol.

When the sliding tandem position is relayed to a driver or a dispatcher, this information may be instrumental in ensuring the proper functionality and safety of the sliding tandem 106. In addition to alerting the driver of potentially critical safety concerns, the data gathered by the tandem position sensing system 200 may be incorporated into online or offline algorithms (that may be running on the remote server 10 or the data receiver 116) to alert the driver when CSA violations are pending or changes in the turning radius of the vehicle are anticipated. In some examples, the remote server 10 or the data receiver 116 may monitor the location of the vehicle 100 and inform the driver of the need to adjust the sliding tandem position when the vehicle crosses a state border that necessitates the adjustment. Further, having knowledge of the sliding tandem position as the tandem is being repositioned, reduces the number of times that the driver needs to exit the truck cab to check the position, thus simplifying the tandem repositioning process.

In some embodiments, the RFID reader 210 is coupled to the electrical system of the trailer/chassis 104 and is electrically powered from the electrical circuit of the anti-lock braking system (ABS), the light circuit providing power to the lights of the trailer/chassis 104, one or more solar panels on the roof of the trailer 104 or at the chassis, a power-over-ethernet (PoE) connection, wireless power transmission, and/or any other suitable source of power. For example, the RFID reader 210 may also include an internal battery (e.g., a rechargeable battery) 218 that can power operations of the RFID reader 210.

As used herein, the term "processing circuit" includes any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

The tandem position sensing system 200 may be designed to be easily installed during trailer manufacture or a retrofit. Referring again to FIGS. 1-2, the housing of the RFID reader 210 may have a visible indication (e.g., a notch, line, arrow, or the like) showing where the center of the reader antenna 212 is located, and the tag platform 202 may have visible indications showing where the center of each tag antenna 222 is located along with a sequential numeric indicator. In some examples, the RFID reader 210 may be attached to the frame of the sliding tandem 106 near the top of the tandem frame such that the antenna is pointing up and about 1 inch to about 2 inches below the lowest trailer frame cross members. The linear position of the installed tag platform 202 may be such that the RFID tag 220 corresponding to the actual tandem locking position is located directly above the reader antenna 212. Here, there is no need to install the tag platform 202 such that the individual RFID tags 220 are precisely aligned with their respective sliding tandem holes 106a (i.e., for each tandem locking position). A linear offset may exist to allow more convenient installation of the components if the correct RFID tag 220 is positioned over the reader antenna 212 for each tandem locking position.

In some examples, the reader antenna 212 may be a 65 mm square antenna or a 25 mm round antenna, and the tag platform 202 may be a 2 inch wide plastic or fiberglass strip with about a 2 inch or about a 4 inch tag separation; however, this is merely an example, and each of the tag platform 202 width and the tag separation may assume any suitable value. The total length of the tag platform 202 may be sufficient to cover all possible sliding tandem locations. For example, the tag platform 202 may be about 60 inches in length to accommodate 29 RFID tags 220 that may be arranged at 2 inch intervals. However, embodiments of the present disclosure are not limited thereto, and the tag platform 202 may be made up of multiple shorter sections (e.g., multiple channels/strips) for ease of installation and shipping.

In some examples, the tag platform 202 may be a channel (e.g., a U-channel) that is filled with a non-conductive encapsulant (e.g., epoxy) to seal the RFID tags 220 from exposure and prevent damage from environmental hazards (e.g., dirt, debris, water, etc.). Here, the wireless nature of the RFID reader interrogation makes the tandem position sensing system 200 less prone to environmental noise/obstruction/contamination.

As described above, the tandem position sensing system 200 is a low-cost solution for determining and reporting the position and state of the sliding tandem, which provides a number of desirable features absent from a trailer not equipped with a tandem position sensor. For example, the driver (or autonomous vehicle) can be alerted to the expected turning radius of the coupled trailer/chassis 104. This information is desirable prior to entering inner cities or other places where tighter turning radiuses are expected or necessary. Further, the driver, dispatcher, or autonomous vehicle can be alerted to sliding tandem positions that violate local laws or ordinances before enforcement officers notice or have a chance to react to the infraction, thus avoiding fines, CSA violations, or the like. The sliding tandem position data can also be used to confirm whether or not the sliding tandem 106 has inadvertently moved during operation, indicating an unlocked tandem 106, which can be a potentially critical safety concern. Furthermore, with tandem position reporting, the driver (or autonomous vehicle) can execute the tandem repositioning without visually checking/verifying the actual position of the sliding tandem (less trips between the cab and tandem leads to less time spent adjusting the sliding tandem and is safer for the driver). Additionally, the tandem position sensing system 200 can be installed during production of new trailers or may be easily retrofitted to existing fielded trailers without the need for complicated calibration. That is, the RFID reader 210 can be "calibrated" with a tape measure and proper placement of the strip relative to the RFID reader 210, and doesn't necessary require communication with a computer.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The tandem position sensing system and/or any other relevant devices or components according to embodiments of the present invention described herein may be implemented utilizing any suitable hardware, firmware (e.g., an application-specific integrated circuit), software, or a suitable combination of software, firmware, and hardware. For example, the various components of the tandem position sensing system may be formed on one integrated circuit (IC) chip or on separate IC chips. Further, the various components of the tandem position sensing system may be implemented on a flexible printed circuit film, a tape carrier package (TCP), a printed circuit board (PCB), or formed on a same substrate. Further, the various components of the tandem position sensing system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

The present disclosure is not to be limited in scope by the specific embodiments described herein. Indeed, other various embodiments of and modifications to the present disclosure, in addition to those described herein, may be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art may recognize that its usefulness is not limited thereto and that the present disclosure may be beneficially implemented in any number of environments for any number of purposes. Accordingly, the claims set forth below should be construed in view of the full breadth and spirit of the present disclosure as described herein and equivalents thereof.

Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and equivalents thereof.

What is claimed is:

1. A tandem position sensing system of a vehicle, comprising:
    a plurality of radio frequency identification (RFID) tags coupled to a trailer or a chassis of the vehicle and arranged along a first direction; and
    an RFID reader coupled to a sliding tandem of the vehicle that is moveable relative to the trailer or the chassis, the RFID reader being configured to identify a unique identifier of one of the plurality of RFID tags that is proximate to the RFID reader, the unique identifier corresponding to a position of the sliding tandem relative to the trailer or the chassis.

2. The tandem position sensing system of claim 1, wherein the sliding tandem is configured to move relative to the trailer or the chassis along the first direction, and
    wherein the first direction is a longitudinal direction of the trailer or the chassis.

3. The tandem position sensing system of claim 1, wherein the plurality of RFID tags are fixedly coupled to a tag platform that is fixedly coupled to an underside of the trailer or the chassis, and
    wherein at least an antenna of the RFID reader is fixedly coupled to a cross-bar of the sliding tandem below the tag platform.

4. The tandem position sensing system of claim 3, wherein the tag platform comprises at least one of a rail, a channel, or a strip, and extends along the first direction, and
wherein the plurality of RFID tags are adhered to the tag platform.

5. The tandem position sensing system of claim 3, wherein the antenna of the RFID reader and the tag platform are oriented such that the RFID tags pass directly above the antenna of the RFID reader as the sliding tandem moves relative to the trailer or the chassis, and
wherein a vertical offset between the RFID reader and the tag platform is about 1 inch to about 3 inches.

6. The tandem position sensing system of claim 1, wherein the plurality of RFID tags are arranged at regular intervals.

7. The tandem position sensing system of claim 1, wherein the sliding tandem has a plurality of tandem locking positions, and is configured to lock in position relative to the trailer at each of the plurality of tandem locking positions,
wherein the plurality of tandem locking positions are spaced at regular intervals, and
wherein at least one of the plurality of RFID tags corresponds in position to each of the plurality of tandem locking positions.

8. The tandem position sensing system of claim 7, wherein a separation between adjacent ones of the tandem locking positions is integer multiples of a separation between adjacent ones of the plurality of RFID tags.

9. The tandem position sensing system of claim 7, wherein a spacing between consecutive ones of the plurality of tandem locking positions is about 4 inches to about 6 inches, and
wherein a spacing between consecutive ones of the plurality of RFID tags is about 2 inches to about 4 inches.

10. The tandem position sensing system of claim 1, wherein an RFID tag of the plurality of RFID tags comprises:
a tag antenna configured to transmit and receive radio frequency (RF) signals; and
an integrated circuit configured to store a unique identifier of the RFID tag, to receive RF energy from the tag antenna, and to modulate the RF energy with the unique identifier to generate a modulated RF signal for transmission by the tag antenna.

11. The tandem position sensing system of claim 1, wherein the RFID reader comprises:
a reader antenna configured to transmit and receive RF signals; and
a processing circuit configured to generate an RF signal for transmission by the reader antenna, to receive a modulated RF signal from the one the plurality of RFID tags that is proximate to the RFID reader via the reader antenna, and to detect the unique identifier based on the modulated RF signal.

12. The tandem position sensing system of claim 11, wherein the processing circuit is further configured to determine the position of the sliding tandem relative to the trailer or the chassis based on the unique identifier, and
wherein the unique identifier comprises data indicating a corresponding tandem locking position.

13. The tandem position sensing system of claim 11, wherein the processing circuit is further configured to determine the position of the sliding tandem relative to the trailer or the chassis based on the unique identifier and a lookup table.

14. The tandem position sensing system of claim 13, wherein the lookup table is stored at the processing circuit and maps unique identifiers of the plurality of RFID tags to a plurality of relative positions of the sliding tandem and the trailer or the chassis.

15. The tandem position sensing system of claim 11, wherein the RFID reader further comprises:
a communication circuit in electrical communication with a telematics gateway circuit at the trailer or the chassis of the vehicle and is configured to transmit data generated by the processing circuit to the telematics gateway circuit over a controller area network (CAN) bus of the trailer or the chassis, an RS232/485 connection, a power line communication (PLC) connection, or a wireless communication link.

16. The tandem position sensing system of claim 11, wherein the RFID reader further comprises:
an internal battery configured to provide electrical power to the RFID reader.

17. The tandem position sensing system of claim 11, wherein the RFID reader is coupled to an electrical system of the trailer or the chassis of the vehicle and receives electrical power from at least one of an electrical circuit of an anti-lock braking system (ABS) of the trailer or the chassis, a light circuit providing power to lights of the trailer or the chassis, a power-over-ethernet (PoE) connection, or a solar panel of the trailer or the chassis.

* * * * *